United States Patent
Lee

(10) Patent No.: US 12,043,233 B2
(45) Date of Patent: Jul. 23, 2024

(54) APPARATUS FOR MOVING BRAKE PEDAL

(71) Applicant: HL MANDO CORPORATION, Pyeongtaek-si (KR)

(72) Inventor: Jusung Lee, Yongin-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 24 days.

(21) Appl. No.: 17/802,093

(22) PCT Filed: Feb. 25, 2021

(86) PCT No.: PCT/KR2021/002418
§ 371 (c)(1),
(2) Date: Aug. 24, 2022

(87) PCT Pub. No.: WO2021/172918
PCT Pub. Date: Sep. 2, 2021

(65) Prior Publication Data
US 2023/0086406 A1 Mar. 23, 2023

(30) Foreign Application Priority Data

Feb. 25, 2020 (KR) .......................... 10-2020-0022673

(51) Int. Cl.
*B60T 7/04* (2006.01)
*B60T 7/06* (2006.01)
*B60T 7/12* (2006.01)

(52) U.S. Cl.
CPC .............. *B60T 7/042* (2013.01); *B60T 7/065* (2013.01); *B60T 7/12* (2013.01); *B60T 2270/82* (2013.01)

(58) Field of Classification Search
None
See application file for complete search history.

(56) References Cited

U.S. PATENT DOCUMENTS

| 5,094,079 A * | 3/1992 | Leigh-Monstevens ...................... B60T 13/66 60/545 |
| 8,459,753 B2 * | 6/2013 | Vollert .................. B60T 13/745 303/114.1 |

(Continued)

FOREIGN PATENT DOCUMENTS

| CN | 105156520 A | 12/2015 |
| JP | 2012-81799 A | 4/2012 |
| KR | 10-2010-0103518 A | 9/2010 |

OTHER PUBLICATIONS

International Search Report (PCT/ISA/210) issued in PCT Application No. PCT/KR2021/002418 dated Jun. 14, 2021 with English Translation.

(Continued)

*Primary Examiner* — Vicky A Johnson
(74) *Attorney, Agent, or Firm* — Harvest IP Law, LLP

(57) ABSTRACT

Disclosed is an apparatus for moving a brake pedal. The apparatus for moving a brake pedal according to the disclosure includes a push rod connecting the brake pedal and a piston of a master cylinder to displace the piston according to a pedal effort of the brake pedal, actuator generating power, a screw configured to displace the piston by receiving a rotational force from the actuator and performing a translational motion, and an anti-rotation portion preventing rotation of the screw, wherein the push rod passes through the screw and is connected to the piston to generate displacement of the piston independently with respect to the translational motion of the screw, and the screw is connected to the actuator to receive the rotational force, and by converting the rotational force into the translational motion by the anti-rotation portion, generates the translational motion of the piston, the push rod, and the brake pedal connected to the screw.

16 Claims, 10 Drawing Sheets

(56) References Cited

U.S. PATENT DOCUMENTS

2009/0026835 A1* 1/2009 Matsubara ............... B60T 7/12
                                                  303/15
2018/0244175 A1   8/2018 Tan

OTHER PUBLICATIONS

Written Opinion (PCT/ISA/237) issued in PCT Application No. PCT/KR2021/002418 dated Jun. 14, 2021.

* cited by examiner

【FIG. 1】
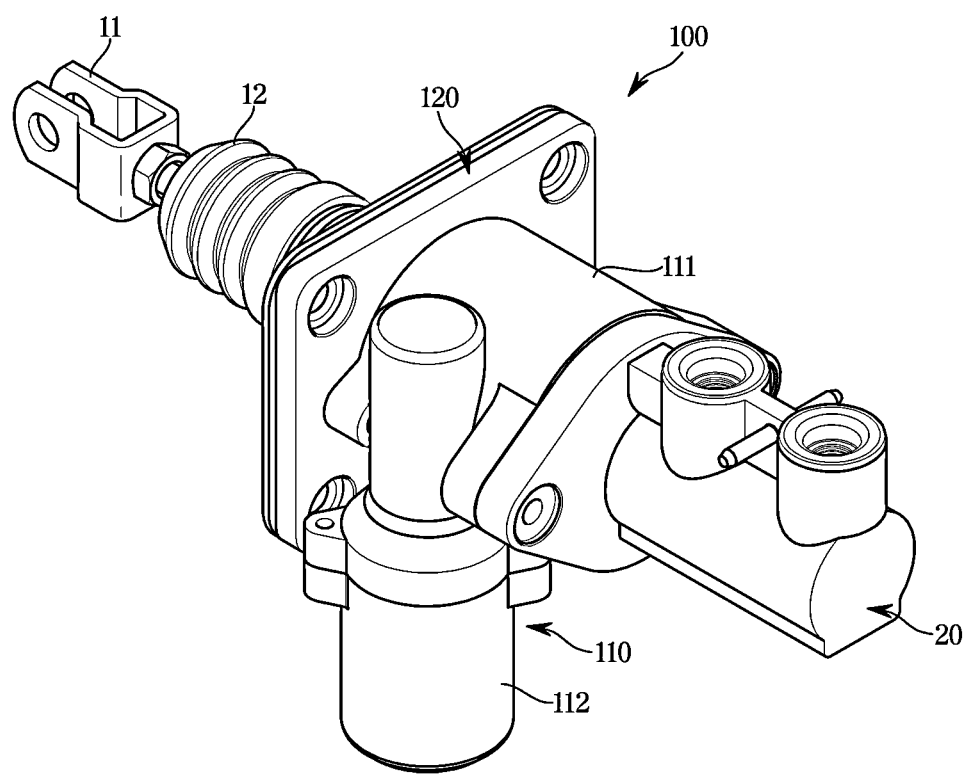

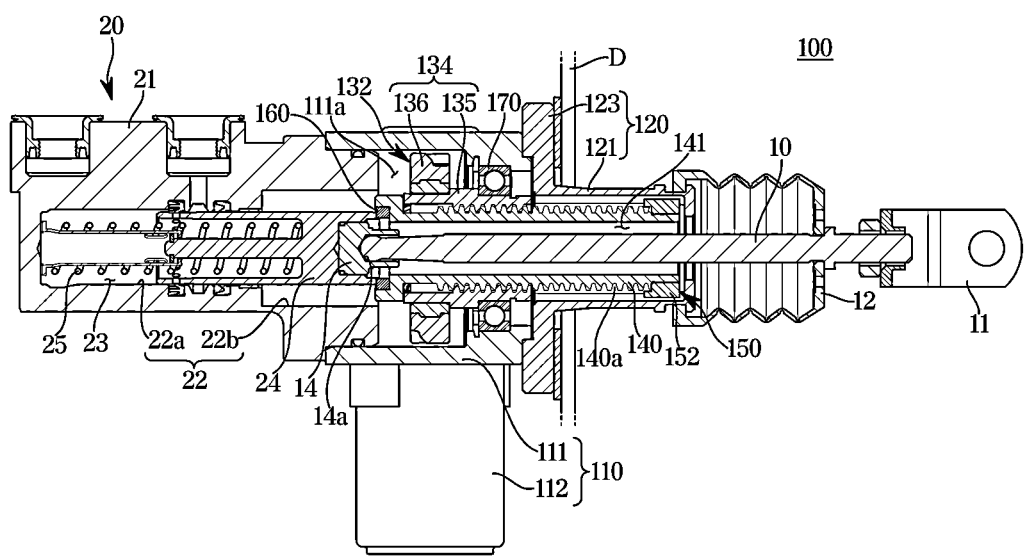
[FIG. 2]

[FIG. 3]
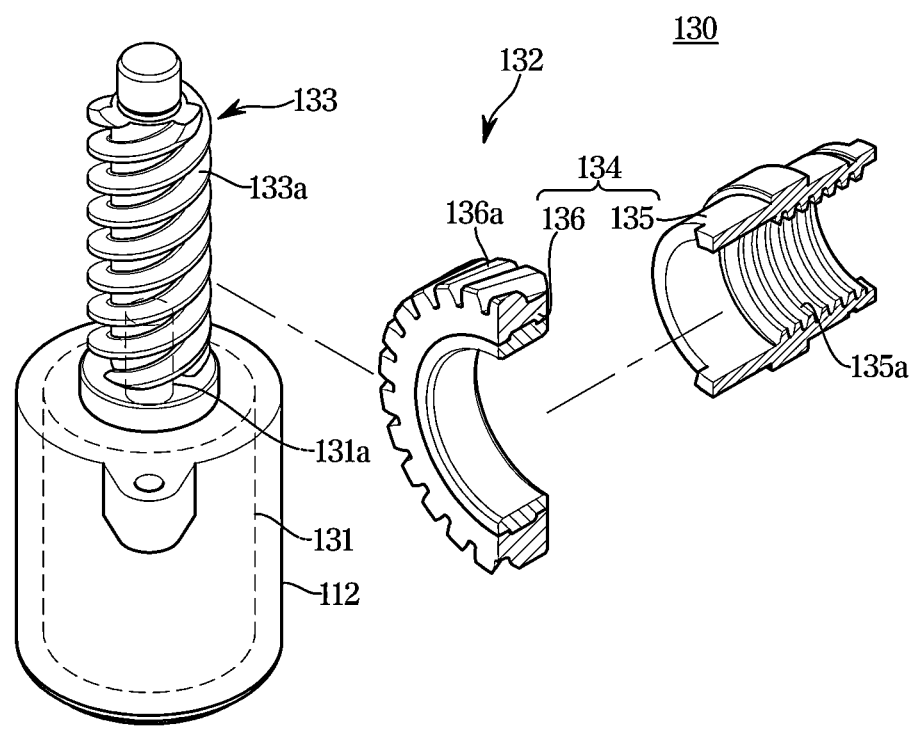

【FIG. 4】
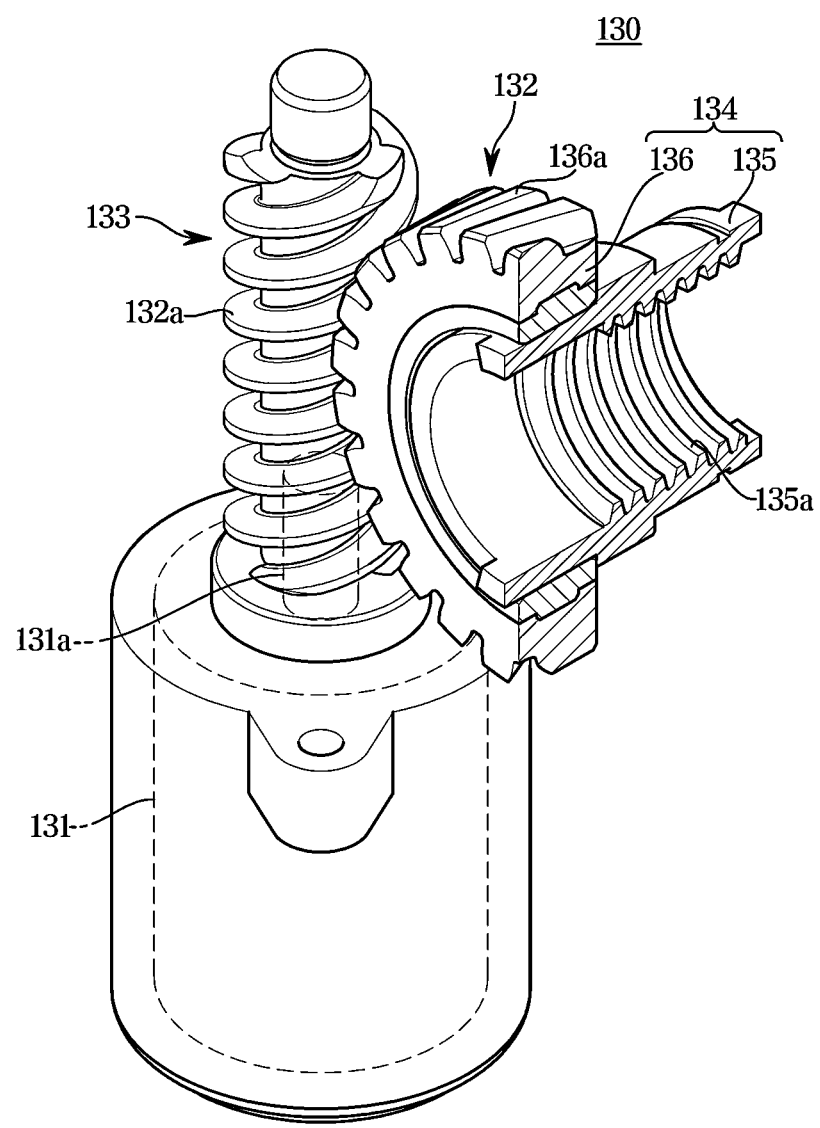

[FIG. 5]
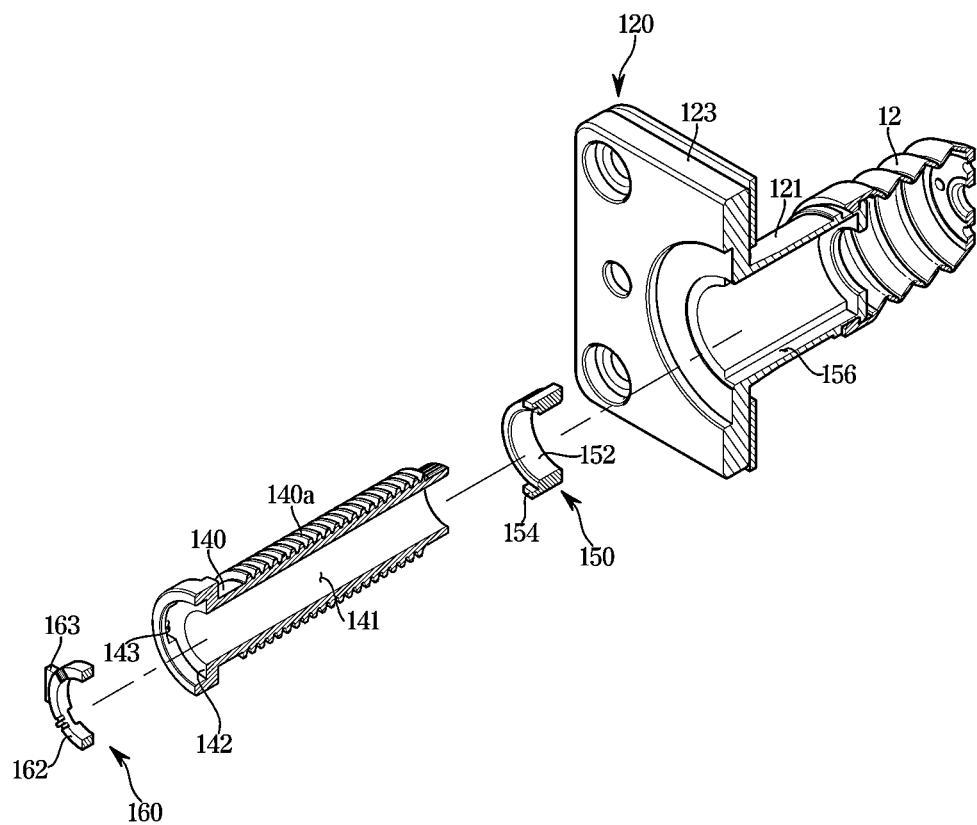

[FIG. 6]
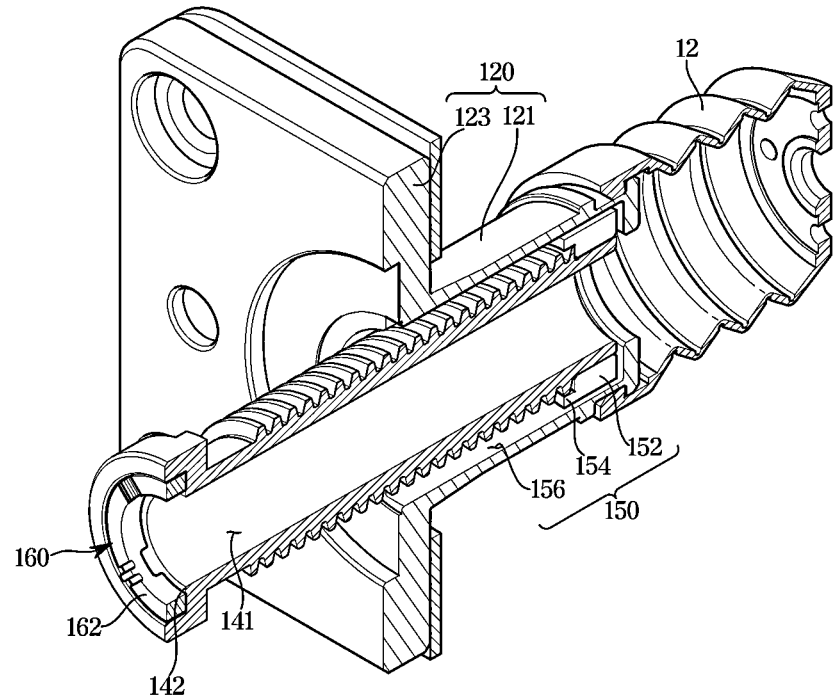<br>

[FIG. 7]
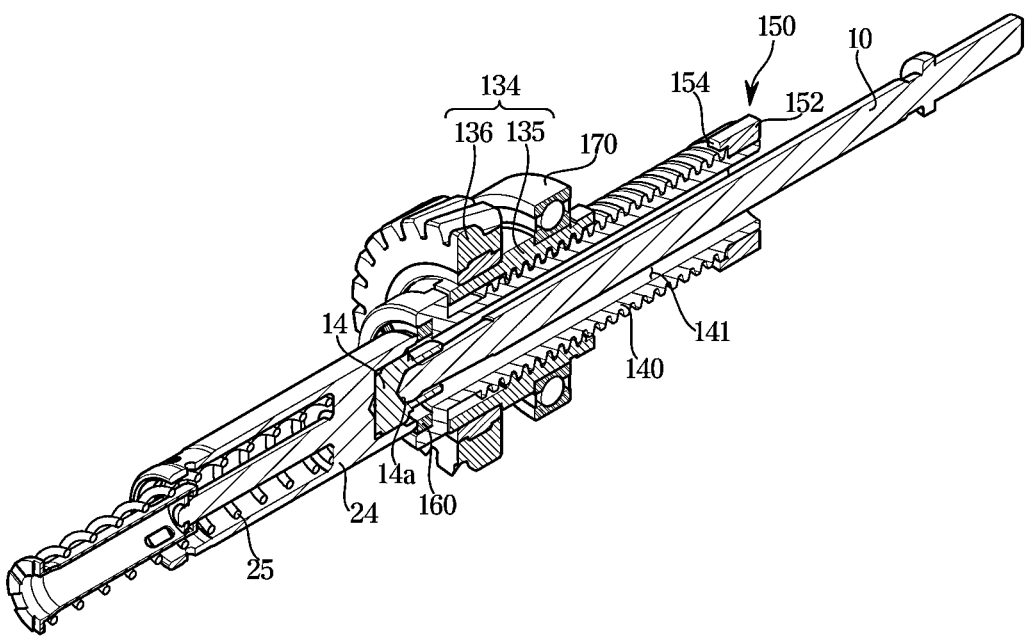

[FIG. 8]
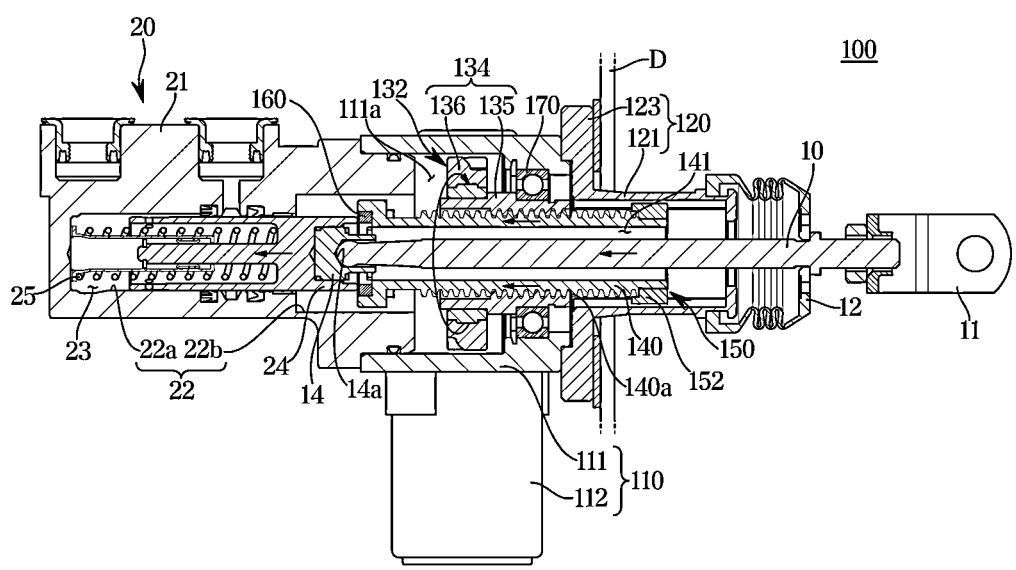

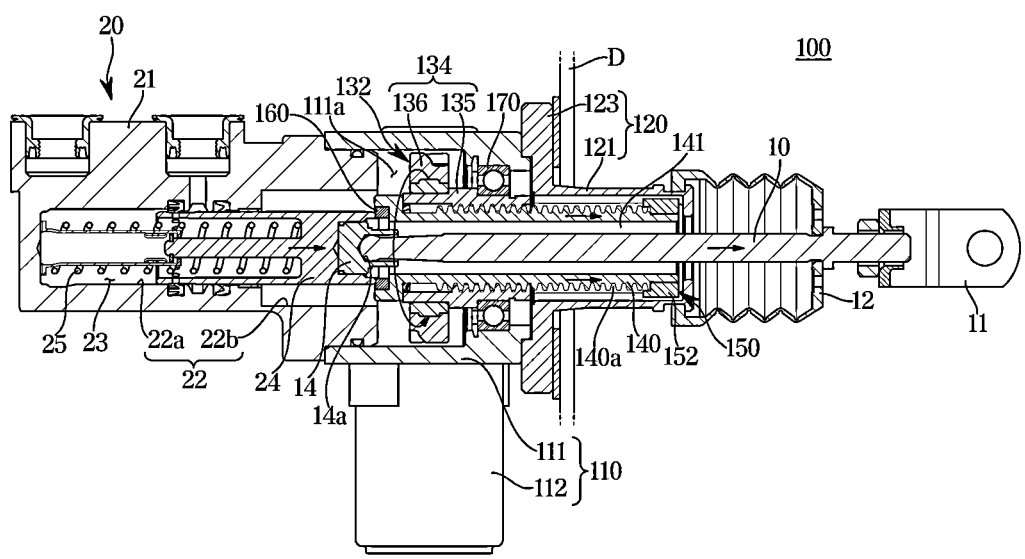
[FIG. 9]

[FIG. 10]
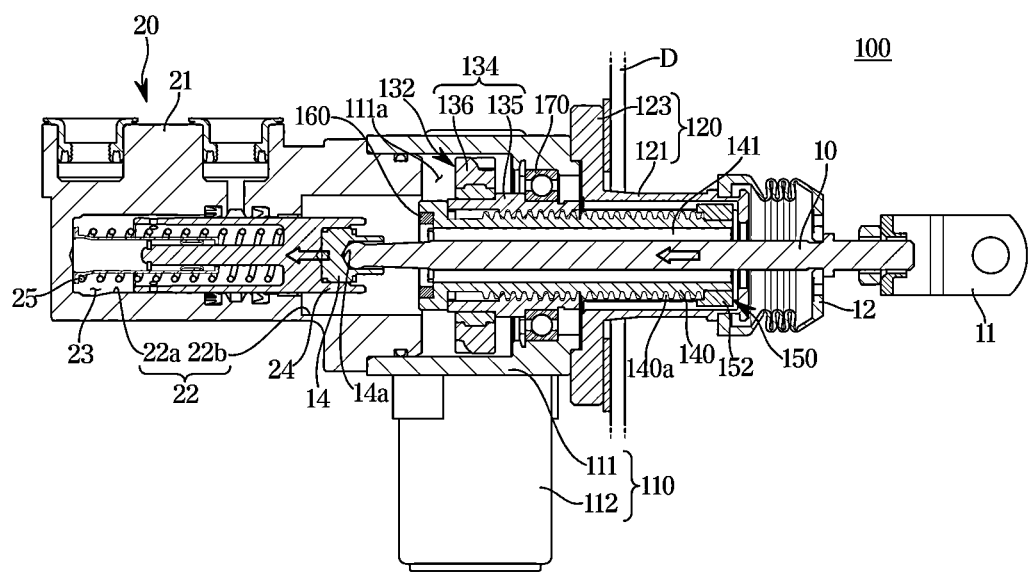

APPARATUS FOR MOVING BRAKE PEDAL

CROSS-REFERENCE OF RELATED APPLICATIONS

This application is the U.S. National Phase under 35 U.S.C. § 371 of International Patent Application No. PCT/KR2021/002418, filed on Feb. 25, 2021, which claims the benefit of Korean Patent Application No. 10-2020-0022673, filed on Feb. 25, 2020, the entire disclosures of each are incorporated by reference herein.

TECHNICAL FIELD

The present disclosure relates to an apparatus for moving a brake pedal, and more particularly, to an apparatus for moving a brake pedal capable of moving the brake pedal forward and backward according to an operating condition of a vehicle.

BACKGROUND ART

Generally, a vehicle is essentially equipped with a brake system for performing braking, and various types of brake systems have been proposed for a safety of a driver and a passenger.

Conventional brake systems mainly use a method of supplying hydraulic pressure required for braking to a wheel cylinder using a mechanically connected booster when a driver depresses a brake pedal. However, nowadays, to implement various braking functions by actively responding to an operating environment of a vehicle, development of an electronic brake system has been ongoing. For example, electronic brake system receives a driver's intention to brake as an electrical signal from a pedal displacement sensor for detecting the displacement of the brake pedal when a driver depresses a brake pedal and based on the electric signal operates a hydraulic pressure supply device to supply a hydraulic pressure required for braking to a wheel cylinder.

In such an electronic brake system, braking of a vehicle is directly or indirectly controlled according to a brake effort for a brake pedal of a driver. Accordingly, the brake pedal remains to be exposed toward a driver in a passenger space of the vehicle so that the driver may perform the operation thereof at any time.

On the other hand, recently, an autonomous driving system, which identifies surrounding information from a camera, a radar, or a sensor mounted on a vehicle and based on the surrounding information allows a vehicle to autonomously run and stop without the intervention of a driver, has been developed. When a vehicle autonomously drives, the vehicle is automatically performed autonomous driving based on the detected information regardless of whether a driver operates a brake pedal. In this case, if the brake pedal remains to be exposed toward a passenger space of the vehicle, a driver may feel uncomfortable, and moreover there is also a risk of injury to a driver's leg by the exposed brake pedal in the case of a vehicle accident during autonomous driving.

DISCLOSURE

Technical Problem

Various aspects of the present disclosure is to provide an apparatus for moving a brake pedal capable of adjusting a position of the brake pedal according to an operating situation of a vehicle.

Various aspects of the present disclosure is to provide an apparatus for moving a brake pedal capable of improving comfortable habitability of a driver by accommodating the brake pedal during autonomous driving of a vehicle.

Various aspects of the present disclosure is to provide an apparatus for moving a brake pedal capable of improving operability of a vehicle by exposing the brake pedal toward a driver when general driving of the vehicle is performed.

Various aspects of the present disclosure is to provide an apparatus for moving a brake pedal capable of easily implementing forward and backward movement of the brake pedal with a simple structure.

Various aspects of the present disclosure is to provide an apparatus for moving a brake pedal capable of minimizing an injury to a driver in the case of a vehicle accident.

Various aspects of the present disclosure is to provide an apparatus for moving a brake pedal capable of minimizing noise when the brake pedal is accommodated or exposed, or when the brake pedal is operated independently.

Technical Solution

In accordance with an aspect of the present disclosure, an apparatus for moving a brake pedal includes a push rod connecting the brake pedal and a piston of a master cylinder and configured to displace the piston according to a pedal effort of the brake pedal, actuator configured to generate power, a screw configured to displace the piston by receiving a rotational force from the actuator and performing a translational motion, and an anti-rotation portion configured to prevent rotation of the screw, wherein the push rod passes through the screw and is connected to the piston to generate displacement of the piston independently with respect to the translational motion of the screw, and the screw is connected to the actuator to receive the rotational force, and by converting the rotational force into the translational motion by the anti-rotation portion, is configured to generate the translational motion of the piston, the push rod, and the brake pedal, which are connected to the screw.

The anti-rotation portion may further include an anti-rotation body fixed to the screw; at least one anti-rotation protrusion protruding from the anti-rotation body; and at least one anti-rotation groove that is recessed in a fixedly installed structure to allow the anti-rotation protrusion to be inserted thereinto.

The anti-rotation body may be provided in a cylindrical shape, and the anti-rotation protrusion may be provided on an outer circumferential surface of the anti-rotation body.

The anti-rotation groove may be configured to extend along a translational movement direction.

The actuator may further include a motor configured to generate power, and a gear assembly provided between a rotation shaft of the motor and the screw.

The gear assembly may further include a first gear coupled to the rotation shaft of the motor, and a second gear meshed with the first gear to transmit the rotational force to the screw.

The second gear may further include a nut portion provided coaxially with the screw, the nut portion having a first thread formed on an inner circumferential surface thereof, and a gear portion provided on an outer circumferential surface of the nut portion and meshing with the first screw thread.

The first gear may be provided as a worm gear, and the second gear may be provided as a worm wheel gear.

The first gear may include first gear teeth on an outer circumferential surface thereof, and the gear portion may include second gear teeth meshing with the first gear teeth on an outer circumferential surface thereof.

The screw may further include a second screw thread formed on an outer circumferential surface thereof, the second screw thread meshing with the first screw thread, and a through hole penetrating in a longitudinal direction at the center the screw.

The apparatus may further include a housing coupled to the master cylinder and a support plate coupled to the housing to be fixed to a dash panel, wherein the anti-rotation groove is recessed in the housing or the support plate.

The housing may further include a housing having an accommodation space therein and fixed to the master cylinder, and a second housing coupled to the first housing to accommodate the motor.

The support plate may further include a cylindrical guide part having a hollow center and extending toward the brake pedal, and a mounting part extending in a radial direction from one side of an outer circumferential surface of the guide part and fixed to the dash panel.

The apparatus may further include a buffer member interposed between the screw and the piston.

The actuator may be automatically controlled by an electronic control unit of a vehicle, or be controlled by receiving an operation signal from a driver.

Advantageous Effects

Various embodiments of present disclosure may provide an apparatus for moving a brake pedal capable of adjusting a position of the brake pedal according to an operating situation of a vehicle.

Various embodiments of present disclosure may provide an apparatus for moving a brake pedal capable of improving comfortable habitability of a driver by accommodating the brake pedal during autonomous driving of a vehicle.

Various embodiments of present disclosure may provide an apparatus for moving a brake pedal capable of improving operability of a vehicle by exposing the brake pedal toward a driver when general driving of the vehicle is performed.

Various embodiments of present disclosure may provide an apparatus for moving a brake pedal capable of easily implementing forward and backward movement of the brake pedal with a simple structure.

Various embodiments of present disclosure may provide an apparatus for moving a brake pedal capable of minimizing an injury to a driver in the case of a vehicle accident.

Various embodiments of present disclosure may provide an apparatus for moving a brake pedal capable of minimizing noise when the brake pedal is accommodated or exposed, or when the brake pedal is operated independently.

DESCRIPTION OF DRAWINGS

These and/or other aspects of the disclosure will become apparent and more readily appreciated from the following description of the embodiments, taken in conjunction with the accompanying drawings of which:

FIG. 1 is a perspective view illustrating in a state in which an apparatus for moving a brake pedal according to an exemplary embodiment of the present disclosure is mounted on a master cylinder.

FIG. 2 is a side cross-sectional view illustrating the apparatus for moving a brake pedal according to an exemplary embodiment of the present disclosure.

FIG. 3 is a partially exploded perspective view illustrating an actuator provided in the apparatus for moving a brake pedal according to an exemplary embodiment of the present disclosure.

FIG. 4 is an assembled cross-sectional perspective view of FIG. 3.

FIG. 5 is an exploded perspective view illustrating an anti-rotation portion of a screw provided in the apparatus for moving a brake pedal according to an exemplary embodiment of the present disclosure.

FIG. 6 is an assembled perspective view of FIG. 5.

FIG. 7 is a cutaway perspective view illustrating a state in which an actuator and a screw of the apparatus for moving a brake pedal according to an exemplary embodiment of the present disclosure are assembled.

FIG. 8 is a side cross-sectional view illustrating a state in which a brake pedal is received from a passenger space (a forward state) by the apparatus for moving a brake pedal according to an exemplary embodiment of the present disclosure.

FIG. 9 is a side cross-sectional view illustrating a state in which the brake pedal is exposed to the passenger space (a backward state) by the apparatus for moving a brake pedal according to an exemplary embodiment of the present disclosure.

FIG. 10 is a side cross-sectional view illustrating the brake pedal being operated in a state in which the brake pedal is exposed to the passenger space by the apparatus for moving a brake pedal according to an exemplary embodiment of the present disclosure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a perspective view illustrating in a state in which an apparatus for moving a brake pedal according to an exemplary embodiment of the present disclosure is mounted on a master cylinder, and FIG. 2 is a side cross-sectional view illustrating the apparatus for moving the brake pedal according to an exemplary embodiment of the present disclosure.

An apparatus for moving a brake pedal 100 according to an exemplary embodiment may move a brake pedal so that comfortable habitability of a driver and operability of a vehicle may be improved depending on an operating situation of the vehicle. In particular, when the vehicle autonomously drives, braking of the vehicle is automatically implemented, so that a driver's operation for the brake pedal is unnecessary. Accordingly, the apparatus for moving the brake pedal 100 according to an exemplary embodiment moves the brake pedal forward (a left direction based on a dash panel D shown in FIG. 2) so as to provide a comfortable habitability to a driver to receive the brake pedal from a passenger space of the vehicle. Conversely, when the vehicle is driven and braked by a driver, the apparatus for moving the brake pedal 100 according to an exemplary embodiment moves the brake pedal backward (a right direction based on the dash panel D shown in FIG. 2) so that a driver may easily operate the brake pedal, thereby exposing the brake pedal toward the passenger space of the vehicle. Furthermore, a position at which the brake pedal is easily manipulated may vary depending on a driver's body size, and a driver may require comfortable habitability even when the vehicle is stopped, so the apparatus for moving the brake pedal 100 according to an exemplary embodiment may adjust the brake pedal to a suitable position.

Referring to FIGS. 1 and 2, the apparatus for moving the brake pedal 100 according to an exemplary embodiment of the present disclosure may include a push rod 10 connected to the brake pedal and provided to move together with a piston 24 of a master cylinder 20, an actuator 130 that provides power for the movement of the brake pedal, a screw 140 that performs a translational motion by receiving the power from the actuator 130, an anti-rotation portion 150 configured to prevent rotation of the screw 140, a housing 110 for accommodating part elements, and support plate 120.

The brake pedal is provided on a passenger space and may be pivotally connected to the push rod 10 through a clevis 11. At this time, the vehicle is divided into an engine room and a passenger space of the vehicle by the dash panel D. The push rod 10 may be connected to the piston 24 provided in the master cylinder 20 through the dash panel D. The brake pedal may generate a displacement by pressing the piston 24 according to the pedal effort of a driver, and be operated independently of the moving device of the brake pedal 100 when the brake pedal is operated according to the driver's intention to brake. Furthermore, when the brake pedal is folded in a forward direction by the apparatus for moving the brake pedal 100, the brake pedal 100 may be accommodated in the passenger space by interlocking with the screw 140 to be described later. A moving state of the brake pedal will be described again below.

On the other hand, although not shown in the drawings, a pedal displacement sensor that measures a displacement of the brake pedal or the push rod 10 and transmits an electrical signal to an electronic control unit (ECU, not shown) may be provided.

One end of the push rod 10 is connected to the clevis 11 and the other end thereof is coupled to a plunger 14, so that the push rod 10 transmits the pedal effort of the brake pedal to the piston 24. The plunger 14 is installed so as to be press-fitted to the piston 24. The plunger 14 has a coupling groove 14a to which the end of the push rod 10 is inserted and coupled so as to serve to convert a curved motion of the brake pedal into a linear motion. Accordingly, by fixing a rotation point of the push rod 10 at coupling groove 14a of the plunger 14, the curved motion of the push rod 10 according to the pedal effort of the brake pedal is converted into the linear motion. Furthermore, because the push rod 10 is connected to the piston 24 through the plunger 14, the push rod 10 is moved together when the piston 24 moves.

The master cylinder 20 is disposed on an engine room side (left direction based on the dash panel D shown in FIG. 2) relative to the dash panel D. The master cylinder 20 includes a cylinder body 21 having a bore 22 formed therein, and the piston 24 provided in the bore 22 of the cylinder body 21 to move forward and backward.

The cylinder body 21 is provided to have the bore 22 with one side open in a longitudinal direction. The cylinder body 21 may be coupled to a housing 110, which will be described later, to be mounted on a vehicle by the support plate 120. At this time, the open side of the cylinder body 21 may be disposed and coupled to communicate with an accommodation space 111a of the housing 110.

The piston 24 is provided in the bore 22 to move forward and backward. More specifically, the bore 22 includes a first bore 22a through which the piston 24 may advance and reverse, and a second bore 22b having a diameter larger than that of the first bore 22a. At this time, the piston 24 is provided to be partially exposed to the second bore 22b. A space between the piston 24 and an inner wall of the other side of the first bore 22a is provided as a hydraulic chamber 23 in which a hydraulic pressure is formed. A return spring 25 for returning the piston 24 to its original position is provided in the hydraulic chamber 23. As shown in the drawings, the master cylinder 20 connected to the moving device of the brake pedal 100 of the disclosure is provided with the single piston 24, the hydraulic chamber 23 and the return spring 25 in the cylinder body 21, but it is not limited thereto, and may be applied as a master cylinder having two pistons, a hydraulic chamber, and a return spring that are commonly used.

The housing 110 may be coupled to the master cylinder 20, and may be coupled to the support plate 120, which will be described later, to be mounted on the dash panel D by the support plate 120. The housing 110 has the accommodation space 111a therein so as to have a space for mounting and receiving various elements to be described later. At this time, the master cylinder 20 and the housing 110 may be coupled such that the accommodation space 111a communicates with the bore 22 of the cylinder body 21. More specifically, the housing 110 includes a first housing 111 having the accommodation space 111a formed therein so as to be connected to the piston 24, and a second housing 112 coupled to the first housing 111 to accommodate a motor 131.

The first housing 111 may be coupled to surround an outer surface of one side of the cylinder body 21. Accordingly, as shown in FIG. 2, the second bore 22b and the accommodation space 111a communicate with each other. Furthermore, the accommodation space 111a formed in the first housing 111 communicates with a hollow portion formed in the support plate 120 coupled to the opposite side of the cylinder body 21. Various part elements may be arranged in the accommodation space 111a. For example, gears 133 and 135 of the actuator 130 to be described later, the screw 140, and the push rod 10 may be partially accommodated in the accommodation space 111a.

The second housing 112 accommodates the motor 131 and is coupled to the first housing 111. At this time, a rotation shaft 131a of the motor 131 protrudes into the accommodation space 111a of the first housing 111 and is disposed in the accommodation space 111a.

The support plate 120 is coupled to the housing 110, that is, the first housing 111 to be fixed to the dash panel D. More specifically, referring to FIGS. 3 and 4, the support plate 120 may include a guide part 121 having a hollow center and extending toward the brake pedal, and a mounting part 123 extending radially from one side of an outer circumferential surface of the guide part 121.

The guide part 121 is formed in a cylindrical shape with the hollow center so as to communicate with the accommodation space 111a of the first housing 111. The guide part 121 passes through the dash panel D and is disposed in the passenger space. In addition, the push rod 10 and a part of the screw 140 to be described later is provided to be inserted into the hollow center inside of the guide part 121. A boot 12 is installed at an end of the guide part 121 to prevent foreign substances such as dust from being introduced into the housing 110. The boot 12 has one end installed on the guide part 121 and the other end thereof installed on the push rod 10, so that the boot 12 may be contractible and expandable according to the operation of the push rod 12. An anti-rotation groove 156 of the anti-rotation portion 150 to be described later may be formed on an inner circumferential surface of the guide part 121. The anti-rotation groove 156 will be described again below.

The mounting part 123 is extended from the outer circumferential surface of one side of the guide part 121 so as to be integrally formed with the guide part 121. The mounting part 123 may be formed in a plate shape and coupled to the dash panel D by a plurality of fixing pins (not shown). Herein, although the first housing 111 is shown to be press-fitted to the mounting part 123, but it is not limited thereto, and the first housing 111 and the mounting part 123 may be coupled to each other through a separate fastening bolt, or the like.

The actuator 130 is provided to generate and transmit power for the movement of the brake pedal and the push rod 10. Such the actuator 130 is shown in more detail in FIGS. 3 and 4.

FIG. 3 is a partially exploded perspective view illustrating the actuator provided in the apparatus for moving the brake pedal according to an exemplary embodiment of the present disclosure, and FIG. 4 is an assembled cross-sectional perspective view of FIG. 3.

Referring to FIGS. 1 to 4, the actuator 130 may include the motor 131 that receives power from a battery of the vehicle (not shown) to generate power, and a gear assembly 132 that is connected to the motor 131 and transmits rotational force to the screw 140 to be described later.

The motor 131 may be provided with the rotation shaft 131a for outputting rotational force and fixed and supported by the second housing 112, and the rotation shaft 131a may be provided to face the first housing 111. The motor 131 may be provided as a bidirectional electric motor 131 that performs forward and reverse rotation to implement forward and backward movement of the brake pedal. Furthermore, the motor 131 may be automatically controlled according to an electrical signal transmitted from the ECU, or may be controlled according to an electrical signal such as an operation signal transmitted by input from a driver.

The gear assembly 132 may include a first gear 133 coupled to the rotation shaft 131a, and a second gear 134 meshed with the first gear 133 to transmit rotational force to the screw 140.

The first gear 133 may be connected to the rotation shaft 131a of the motor 131 to transmit rotational force or power output from the motor 131 to the second gear 134. On an outer circumferential surface of the first gear 133 is formed first gear teeth 133a. Furthermore, the first gear 133 may rotate together coaxially with the rotation shaft 131a of the motor 131, and by machining gear teeth on the rotation shaft 131a, the rotation shaft 131a may be formed as the first gear 133.

The second gear 134 may include a nut portion 135 screw-coupled with the screw 140 to be described later, and a gear portion 136 provided on one side of an outer circumferential surface of the nut portion 135 and meshed with the first gear 133. The nut portion 134 has a cylindrical shape with a hollow center and a first screw thread 135a is formed on an inner circumferential surface as a male thread or a female thread. The gear portion 136 has a ring-shaped body and has second gear teeth 136a meshing with the first gear teeth 133a is formed on an outer circumferential surface thereof. Herein, although the gear portion 136 is shown as being coupled to the nut portion 135, the disclosure is not limited thereto, and the gear portion 136 and the nut portion 135 may be provided integrally.

Meanwhile, the first gear 133 is provided as a worm gear, and the second gear 134 is provided as a worm wheel gear having the first screw thread 135a formed on the inner circumferential surface thereof, so that the power transmitted from the motor 131 may be provided to the screw 140. Furthermore, the first and second gears 133 and 134 may decelerate the power transmitted from the motor 131 and transmit the decelerated power to the screw 140. Although the drawings show that the first and second gears 133 and 134 are applied as a worm gear and a worm wheel gear, this is only an example for helping understanding of the disclosure and is not limited to the corresponding gear structure.

The screw 140 has a through-hole 141 penetrated in a longitudinal direction in the center thereof. Accordingly, the push rod 10 may be connected to the piston 24 through the through-hole 141 without interfering with the screw 140. Furthermore, on the outer circumferential surface of the screw 140 may be formed a second screw thread 140a provided as a female or male thread meshing with the first screw thread 135a of the second gear 134. Because the screw 140 and the second gear 134 are screw-coupled by the second screw thread 140a and the first screw thread 135a, the rotational force of the second gear 134 is transmitted to the screw 140. At this time, the screw 140 converts the rotational force into a translational motion, so that the rotation thereof is restricted so as to move in the moving direction of the piston 24. The anti-rotation portion 150 for limiting the rotation of the screw 140 is illustrated in more detail in FIGS. 5 and 6.

FIG. 5 is an exploded perspective view illustrating the anti-rotation portion of the screw provided in the apparatus for moving the brake pedal according to an exemplary embodiment of the present disclosure, and FIG. 6 is an assembled perspective view of FIG. 5.

Referring to FIGS. 5 and 6, the anti-rotation portion 150 includes an anti-rotation body 152 fixed to the screw 140, at least one anti-rotation protrusion 154 protruding from the anti-rotation body 152 along a moving direction of the screw 140, and at least one anti-rotation groove 156 that is recessed in a fixedly installed structure to allow the anti-rotation protrusion 154 to be inserted thereinto.

The anti-rotation body 152 is provided in a cylindrical shape and has a hollow portion therein in which a part of the screw 140 is fitted. In other words, the anti-rotation body 152 is coupled to be fixed to a rear side of the screw 140 through the hollow portion. For example, because the screw 140 has teeth at a portion to which the anti-rotation body 152 is coupled, when the screw is coupled to the anti-rotation body, the inner circumferential surface of the anti-rotation body 152 is cut by the teeth, so that the screw 140 and the anti-rotation body 152 may be coupled to each other.

The anti-rotation protrusion 154 may be formed on the outer circumferential surface of the anti-rotation body 152, and may be formed to protrude in the moving direction of the screw 140, that is, in the forward and backward directions of the piston 24 so that the screw 140 does not rotate and moves in a translational motion.

The anti-rotation groove 156 may be recessed at a position opposite to the anti-rotation protrusion 154 on a structure fixedly installed on a vehicle body. For example, the anti-rotation groove 156 may be recessed inside the housing 110 or the support plate 120. In addition, the anti-rotation groove 156 is formed to extend along the longitudinal direction or the translational movement direction. This is because the anti-rotation protrusion 154 enters the anti-rotation groove 156 to prevent the screw 140 from rotating, so that the anti-rotation body 152 moves together when the screw 140 is translated. In other words, during the translational movement of the screw 140, the anti-rotation protrusion 154 is guided along the anti-rotation groove 156 to move. The anti-rotation grooves 156 may be provided to correspond to the shape and number of the anti-rotation protrusions 154.

According to one aspect of the disclosure, since the screw 140 moves translationally by the anti-rotation portion 150 and accordingly presses the piston 24 to be moved, a buffer member 160 may be provided on a surface in contact with the piston 24 to prevent noise. The buffer member 160 is installed at one end of the screw 140. More specifically, the buffer member 160 may include a ring-shaped body portion 162 with a hollow center, and a plurality of stoppers 163 protruding at regular intervals along an outer circumferential surface of the body portion 162. In addition, a step portion 142 corresponding to the body portion 162 is formed in the front of the screw 140 so that the body portion 162 is seated, and the step portion 142 may be provided with a stopper groove 143 into which the stopper 163 is fitted. Accordingly, the body portion 162 is installed to be in close contact with the step portion 142 and the stopper 163 is inserted into the stopper groove 143, thereby preventing the buffer member 160 from being separated from the screw 140. The buffer member 160 may be made of a rubber material to absorb shock. As a result, when the piston 24 operates by the push rod 10 and then returns to its original position, it is possible to prevent direct contact with the screw 140, thereby preventing slap noise, and as well as even when the piston 24 is pressed through the screw 140, it is possible to prevent noise.

A bearing 170 may be interposed between the second gear 134 and the housing 110 so that the second gear 134 rotates smoothly when rotational force is transmitted to the screw 140 as described above. Referring to FIGS. 2 and 7, the bearing 170 has an inner ring mounted on the outer circumferential surface of the nut portion 135 of the second gear 134 and the outer ring supported from the inside of the first housing 111, so that the bearing 170 may promote smooth rotation of the second gear 134 and minimize wear and noise between elements.

Hereinafter, an operation of the moving device of the brake pedal according to an exemplary embodiment of the present disclosure will be described.

FIG. 8 is a side cross-sectional view illustrating a state in which the brake pedal is received from the passenger space (a forward state) by the apparatus for moving the brake pedal according to an exemplary embodiment of the present disclosure.

Referring to FIG. 8, to accommodate or move forward (a left direction based on FIG. 8) the brake pedal 100 during autonomous driving of the vehicle or at the request of a driver, the ECU transmits an electrical signal to allow the rotation shaft 131a of the motor 131 to rotate in one direction (clockwise). As a result, the first gear 133 connected to the rotation shaft 131a of the motor 131 rotates together, and accordingly, the second gear 134 also rotates together. In other words, the gear portion 136 and the nut portion 135 of the second gear 134 rotate together. The rotational force or power of the second gear 135 is transmitted to the screw-coupled screw 140, and at this time, because the rotation of the screw 140 is restricted by the anti-rotation portion 150, the screw 140 advances while pressing the piston 24. As a result, the screw 140 moves toward the second bore 22b, and as the piston 24 advances, the push rod 10 and the brake pedal connected to the piston 24 advance together, resulting in received from the passenger space of the vehicle.

Hereinafter, an operating state in which the brake pedal is exposed to the passenger space and operated will be described.

FIG. 9 is a side cross-sectional view illustrating a state in which the brake pedal is exposed to the passenger space (a backward state) by an apparatus for moving a brake pedal according to an exemplary embodiment of the present disclosure.

Referring to FIG. 9, when the autonomous driving of the vehicle is terminated or a braking operation is performed by a driver's request, the brake pedal is exposed or moved backward (left direction based on FIG. 9). In other words, the electric signal is transmitted through the ECU to rotate the rotation shaft 131a of the motor 131 in the other direction (counterclockwise). As a result, the first gear 133 connected to the rotation shaft 131a of the motor 131 rotates together, and accordingly, the second gear 134 also rotates together. The rotational force or power of the second gear 134 is transmitted to the screw-coupled screw 140, and the screw 140 whose rotation is restricted by the anti-rotation portion 150 moves backward, leading to returning to its original position. Furthermore, as the piston 24 is returned together with the screw 140 by the return spring 25, the push rod 10 and the brake pedal connected to the piston 24 move backward together, thereby exposed to the passenger space of the vehicle.

An operating state in which the driver performs braking while the brake pedal is exposed to the passenger space of the vehicle will be described with reference to FIG. 10.

Referring to FIG. 10, as the driver applies the pedal effort to the brake pedal, the push rod 10 and the piston 24 connected to the push rod 10 move forward together. At this time, because the push rod 10 is made to press the piston 24 without interference through the through-hole 141 of the screw 140, the push rod advances stably and presses the piston 24, thereby implementing braking.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An apparatus for moving a brake pedal, the apparatus comprising:
   a push rod connecting the brake pedal and a piston of a master cylinder and configured to displace the piston according to a pedal effort of the brake pedal;
   actuator configured to generate power;
   a screw configured to displace the piston by receiving a rotational force from the actuator and performing a translational motion; and
   an anti-rotation portion configured to prevent rotation of the screw,
   wherein the push rod passes through the screw and is connected to the piston to generate displacement of the piston independently with respect to the translational motion of the screw,
   a forward end of the push rod is coupled with the piston such that the displacement of the piston in a forward direction generates the translational motion of the push rod in the forward direction, and the screw is connected to the actuator to receive the rotational force, and by converting the rotational force into the translational motion by the anti-rotation portion, is configured to generate the translational motion of the piston in the forward direction, which causes the translational motion of the push rod, and the brake pedal in the forward direction.

2. The apparatus of claim 1, wherein
the anti-rotation portion further comprises:
an anti-rotation body fixed to the screw;
at least one anti-rotation protrusion protruding from the anti-rotation body; and
at least one anti-rotation groove that is recessed in a fixedly installed structure to allow the anti-rotation protrusion to be inserted thereinto.

3. The apparatus of claim 2, wherein
the anti-rotation body is provided in a cylindrical shape, and
the anti-rotation protrusion is provided on an outer circumferential surface of the anti-rotation body.

4. The apparatus of claim 3, wherein
the anti-rotation groove is configured to extend along a translational movement direction.

5. The apparatus of claim 2, wherein
the actuator further comprises:
a motor configured to generate power, and
a gear assembly provided between a rotation shaft of the motor and the screw.

6. The apparatus of claim 5, wherein
the gear assembly further comprises:
a first gear coupled to the rotation shaft of the motor, and
a second gear meshed with the first gear to transmit the rotational force to the screw.

7. The apparatus of claim 6, wherein
the second gear further comprises:
a nut portion provided coaxially with the screw, the nut portion having a first thread formed on an inner circumferential surface thereof, and
a gear portion provided on an outer circumferential surface of the nut portion and meshing with the first screw thread.

8. The apparatus of claim 7, wherein
the first gear includes first gear teeth on an outer circumferential surface thereof, and
the gear portion includes second gear teeth meshing with the first gear teeth on an outer circumferential surface thereof.

9. The apparatus of claim 7, wherein
the screw further comprises:
a second screw thread formed on an outer circumferential surface thereof, the second screw thread meshing with the first screw thread, and
a through hole penetrating in a longitudinal direction at the center the screw.

10. The apparatus of claim 6, wherein
the first gear is provided as a worm gear, and
the second gear is provided as a worm wheel gear.

11. The apparatus of claim 5, further comprising a housing coupled to the master cylinder and a support plate coupled to the housing to be fixed to a dash panel,
wherein the anti-rotation groove is recessed in the housing or the support plate.

12. The apparatus of claim 11, wherein
the housing further comprises:
a housing having an accommodation space therein and fixed to the master cylinder, and
a second housing coupled to the first housing to accommodate the motor.

13. The apparatus of claim 11, wherein
the support plate further comprises:
a cylindrical guide part having a hollow center and extending toward the brake pedal, and
a mounting part extending in a radial direction from one side of an outer circumferential surface of the guide part and fixed to the dash panel.

14. The apparatus of claim 1, further comprising a buffer member interposed between the screw and the piston.

15. The apparatus of claim 1, wherein
the actuator is configured to be automatically controlled by an electronic control unit of a vehicle, or be controlled by receiving an operation signal from a driver.

16. The apparatus of claim 1,
wherein the piston includes a plunger having a coupling groove which the forward end of the push rod is inserted and coupled.

* * * * *